US008559341B2

(12) United States Patent
Bulusu

(10) Patent No.: US 8,559,341 B2
(45) Date of Patent: Oct. 15, 2013

(54) SYSTEM AND METHOD FOR PROVIDING A LOOP FREE TOPOLOGY IN A NETWORK ENVIRONMENT

(75) Inventor: Shekher Bulusu, Fremont, CA (US)

(73) Assignee: Cisco Technology, Inc., San Jose, CA (US)

( * ) Notice: Subject to any disclaimer, the term of this patent is extended or adjusted under 35 U.S.C. 154(b) by 197 days.

(21) Appl. No.: 12/941,881

(22) Filed: Nov. 8, 2010

(65) Prior Publication Data
US 2012/0113871 A1 May 10, 2012

(51) Int. Cl.
H04L 12/28 (2006.01)
(52) U.S. Cl.
USPC ........... 370/256; 370/352; 370/389; 370/390; 370/401
(58) Field of Classification Search
USPC ............ 370/256, 352, 389, 390, 392, 395.31, 370/401
See application file for complete search history.

(56) References Cited

U.S. PATENT DOCUMENTS

| 4,006,320 | A | 2/1977 | Markl |
| 4,486,877 | A | 12/1984 | Turner |
| 4,569,042 | A | 2/1986 | Larson |
| 4,630,268 | A | 12/1986 | Rodenbaugh |
| 4,907,277 | A | 3/1990 | Callens et al. |
| 5,010,544 | A | 4/1991 | Chang et al. |
| 5,014,265 | A | 5/1991 | Hahne et al. |
| 5,121,382 | A | 6/1992 | Yang et al. |
| 5,159,592 | A | 10/1992 | Perkins |
| 5,243,342 | A | 9/1993 | Kattemalalavadi et al. |
| 5,265,092 | A | 11/1993 | Soloway et al. |
| 5,274,643 | A | 12/1993 | Fisk |
| 5,321,694 | A | 6/1994 | Chang et al. |
| 5,341,477 | A | 8/1994 | Pitkin et al. |
| 5,343,461 | A | 8/1994 | Barton et al. |
| 5,353,283 | A | 10/1994 | Tsuchiya |
| 5,371,852 | A | 12/1994 | Attanasio et al. |
| 5,394,402 | A | 2/1995 | Ross |
| 5,416,842 | A | 5/1995 | Aziz |

(Continued)

FOREIGN PATENT DOCUMENTS

| WO | WO 2008/010918 | 1/2008 |
| WO | WO 2009/014967 | 1/2009 |

OTHER PUBLICATIONS

U.S. Appl. No. 12/475,124, filed May 29, 2009, entitled "Transient Loop Prevention in a Hybrid Layer-2 Network," Inventor(s): Tameen Khan et al.

(Continued)

Primary Examiner — Andrew Lai
Assistant Examiner — Andrew C Lee
(74) Attorney, Agent, or Firm — Patent Capitol Group

(57) ABSTRACT

An example method is provided and includes executing an intermediate system to intermediate system (IS-IS) protocol for a first set of network links in a network. The method also includes executing a spanning tree protocol (STP) for a second set of network links, and generating a network topology that includes using a broadcast tree system identifier (ID) as a root bridge ID for the network. The method further includes communicating the root bridge ID to a neighboring network element. In more specific examples, an STP block is communicated to a redundant link, which connects a first switch and a second switch. The first and second switches can converge on the network topology using the broadcast tree system ID.

14 Claims, 6 Drawing Sheets

(56) References Cited

U.S. PATENT DOCUMENTS

| | | | |
|---|---|---|---|
| 5,422,876 A | 6/1995 | Turudic |
| 5,426,637 A | 6/1995 | Derby et al. |
| 5,430,715 A | 7/1995 | Corbalis et al. |
| 5,430,727 A | 7/1995 | Callon |
| 5,450,394 A | 9/1995 | Gruber |
| 5,450,449 A | 9/1995 | Kroon |
| 5,452,294 A | 9/1995 | Natarajan |
| 5,459,837 A | 10/1995 | Caccavale |
| 5,473,599 A | 12/1995 | Li et al. |
| 5,477,531 A | 12/1995 | McKee et al. |
| 5,491,692 A | 2/1996 | Gunner et al. |
| 5,500,851 A | 3/1996 | Kozaki et al. |
| 5,500,860 A | 3/1996 | Perlman et al. |
| 5,509,123 A | 4/1996 | Dobbins et al. |
| 5,519,704 A | 5/1996 | Farinacci et al. |
| 5,521,907 A | 5/1996 | Ennis et al. |
| 5,555,256 A | 9/1996 | Calamvokis |
| 5,561,669 A | 10/1996 | Lenney et al. |
| 5,563,875 A | 10/1996 | Hefel et al. |
| 5,594,732 A | 1/1997 | Bell et al. |
| 5,602,918 A | 2/1997 | Chen et al. |
| 5,604,803 A | 2/1997 | Aziz |
| 5,617,417 A | 4/1997 | Sathe et al. |
| 5,617,421 A | 4/1997 | Chin et al. |
| 5,621,721 A | 4/1997 | Vatuone |
| 5,623,492 A | 4/1997 | Teraslinna |
| 5,623,605 A | 4/1997 | Keshav et al. |
| 5,642,515 A | 6/1997 | Jones et al. |
| 5,650,993 A | 7/1997 | Lakshman et al. |
| 5,651,002 A | 7/1997 | Van Seters et al. |
| 5,659,542 A | 8/1997 | Bell et al. |
| 5,673,265 A | 9/1997 | Gupta et al. |
| 5,675,741 A | 10/1997 | Aggarwal et al. |
| 5,689,566 A | 11/1997 | Nguyen |
| 5,699,478 A | 12/1997 | Nahumi |
| 5,699,485 A | 12/1997 | Shoham |
| 5,708,502 A | 1/1998 | Denton et al. |
| 5,715,399 A | 2/1998 | Bezos |
| 5,740,171 A | 4/1998 | Mazzola et al. |
| 5,740,176 A | 4/1998 | Gupta et al. |
| 5,742,604 A | 4/1998 | Edsall et al. |
| 5,764,636 A | 6/1998 | Edsall |
| 5,793,763 A | 8/1998 | Mayes et al. |
| 5,812,528 A | 9/1998 | VanDervort |
| 5,819,089 A | 10/1998 | White |
| 5,835,494 A | 11/1998 | Hughes et al. |
| 5,838,994 A | 11/1998 | Valizadeh |
| 5,850,388 A | 12/1998 | Anderson et al. |
| 5,867,666 A | 2/1999 | Harvey |
| 5,870,397 A | 2/1999 | Chauffour et al. |
| 5,870,557 A | 2/1999 | Bellovin et al. |
| 5,884,010 A | 3/1999 | Chen et al. |
| 5,894,556 A | 4/1999 | Grimm et al. |
| 5,905,871 A | 5/1999 | Buskens et al. |
| 5,917,820 A | 6/1999 | Rekhter |
| 5,918,017 A | 6/1999 | Attanasio et al. |
| 5,918,019 A | 6/1999 | Valencia |
| 5,931,961 A | 8/1999 | Ranganathan et al. |
| 5,943,347 A | 8/1999 | Shepard |
| 5,983,265 A | 11/1999 | Martino, II |
| 5,987,011 A | 11/1999 | Toh |
| 5,991,809 A | 11/1999 | Kriegsman |
| 6,003,079 A | 12/1999 | Friedrich et al. |
| 6,006,264 A | 12/1999 | Colby et al. |
| 6,009,081 A | 12/1999 | Wheeler et al. |
| 6,018,516 A | 1/2000 | Packer |
| 6,023,455 A | 2/2000 | Takahashi |
| 6,023,733 A | 2/2000 | Periasamy et al. |
| 6,031,846 A | 2/2000 | Gurusami et al. |
| 6,032,194 A | 2/2000 | Gai et al. |
| 6,041,352 A | 3/2000 | Burdick et al. |
| 6,061,454 A | 5/2000 | Malik et al. |
| 6,070,190 A | 5/2000 | Reps et al. |
| 6,078,590 A | 6/2000 | Farinacci et al. |
| 6,078,956 A | 6/2000 | Bryant et al. |
| 6,088,717 A | 7/2000 | Reed et al. |
| 6,094,562 A | 7/2000 | Zhong |
| 6,101,180 A | 8/2000 | Donahue et al. |
| 6,104,695 A | 8/2000 | Wesley et al. |
| 6,115,711 A | 9/2000 | White |
| 6,115,752 A | 9/2000 | Chauhan |
| 6,118,765 A | 9/2000 | Phillips |
| 6,118,796 A | 9/2000 | Best et al. |
| 6,185,203 B1 | 2/2001 | Berman |
| 6,192,036 B1 | 2/2001 | Buhler et al. |
| 6,230,271 B1 | 5/2001 | Wadlow et al. |
| 6,252,851 B1 | 6/2001 | Siu et al. |
| 6,275,471 B1 | 8/2001 | Bushmitch et al. |
| 6,278,687 B1 | 8/2001 | Hunneyball |
| 6,286,045 B1 | 9/2001 | Griffiths et al. |
| 6,317,775 B1 | 11/2001 | Coile et al. |
| 6,337,861 B1 | 1/2002 | Rosen |
| 6,356,545 B1 | 3/2002 | Vargo et al. |
| 6,363,477 B1 | 3/2002 | Fletcher et al. |
| 6,389,006 B1 | 5/2002 | Bialik |
| 6,445,717 B1 | 9/2002 | Gibson et al. |
| 6,446,121 B1 | 9/2002 | Shah et al. |
| 6,510,150 B1 | 1/2003 | Ngo |
| 6,515,967 B1 | 2/2003 | Wei et al. |
| 6,526,044 B1 | 2/2003 | Cookmeyer et al. |
| 6,535,490 B1 | 3/2003 | Jain |
| 6,563,796 B1 | 5/2003 | Saito |
| 6,578,066 B1 | 6/2003 | Logan et al. |
| 6,584,438 B1 | 6/2003 | Manjunath et al. |
| 6,614,781 B1 | 9/2003 | Elliott et al. |
| 6,628,624 B1 | 9/2003 | Mahajan et al. |
| 6,665,637 B2 | 12/2003 | Bruhn |
| 6,680,921 B1 | 1/2004 | Svanbro et al. |
| 6,687,225 B1 | 2/2004 | Kawarai et al. |
| 6,687,360 B2 | 2/2004 | Kung et al. |
| 6,700,874 B1 | 3/2004 | Takihiro et al. |
| 6,725,191 B2 | 4/2004 | Mecayten |
| 6,731,609 B1 | 5/2004 | Hirni et al. |
| 6,741,600 B1 | 5/2004 | Weiss et al. |
| 6,757,654 B1 | 6/2004 | Westerlund et al. |
| 6,765,881 B1 * | 7/2004 | Rajakarunanayake ........ 370/256 |
| 6,775,703 B1 | 8/2004 | Burns et al. |
| 6,785,261 B1 | 8/2004 | Schuster et al. |
| 6,798,739 B1 | 9/2004 | Lee |
| 6,804,244 B1 | 10/2004 | Anandakumar et al. |
| 6,836,804 B1 | 12/2004 | Jagadeesan |
| 6,839,353 B1 | 1/2005 | DeJager |
| 6,845,091 B2 | 1/2005 | Ogier et al. |
| 6,901,048 B1 | 5/2005 | Wang et al. |
| 6,917,983 B1 | 7/2005 | Li |
| 6,940,821 B1 | 9/2005 | Wei et al. |
| 6,944,132 B1 | 9/2005 | Aono et al. |
| 6,947,381 B2 | 9/2005 | Wen et al. |
| 7,013,267 B1 | 3/2006 | Huart et al. |
| 7,024,257 B2 | 4/2006 | Pearce et al. |
| 7,039,716 B1 | 5/2006 | Jagadeesan |
| 7,047,190 B1 | 5/2006 | Kapilow |
| 7,068,607 B2 | 6/2006 | Partain et al. |
| 7,069,034 B1 | 6/2006 | Sourour |
| 7,072,968 B2 | 7/2006 | Mikami et al. |
| 7,099,820 B1 | 8/2006 | Huart et al. |
| 7,133,368 B2 | 11/2006 | Zhang et al. |
| 7,143,184 B1 | 11/2006 | Shah et al. |
| 7,212,517 B2 | 5/2007 | Dzik |
| 7,283,474 B1 | 10/2007 | Bergenwall |
| 7,286,467 B1 | 10/2007 | Sylvain |
| 7,289,454 B2 | 10/2007 | Bovo et al. |
| 7,310,334 B1 | 12/2007 | FitzGerald et al. |
| 7,336,620 B2 | 2/2008 | Bennett |
| 7,352,700 B2 | 4/2008 | Chan et al. |
| 7,352,705 B1 | 4/2008 | Adhikari et al. |
| 7,406,034 B1 | 7/2008 | Cometto et al. |
| 7,417,993 B1 | 8/2008 | Ebergen et al. |
| 7,426,577 B2 | 9/2008 | Bardzil et al. |
| 7,457,877 B1 | 11/2008 | Shah et al. |
| 7,483,370 B1 * | 1/2009 | Dayal et al. ................... 370/219 |
| 7,496,044 B1 | 2/2009 | Wing |
| 7,519,006 B1 | 4/2009 | Wing |
| 7,564,858 B1 | 7/2009 | Moncada-Elias et al. |

(56) References Cited

U.S. PATENT DOCUMENTS

| | | | |
|---|---|---|---|
| 7,643,430 B2 | 1/2010 | Morandin | |
| 7,660,314 B2 * | 2/2010 | Wybenga et al. | 370/400 |
| 7,672,227 B2 * | 3/2010 | Santoso et al. | 370/217 |
| 7,729,267 B2 | 6/2010 | Oran et al. | |
| 7,760,735 B1 | 7/2010 | Chen et al. | |
| 7,817,580 B2 | 10/2010 | Jain et al. | |
| 7,864,712 B2 | 1/2011 | Khan et al. | |
| 7,870,611 B2 | 1/2011 | Ishikawa | |
| 7,886,080 B2 | 2/2011 | Sajassi et al. | |
| 7,944,470 B2 | 5/2011 | Foster et al. | |
| 7,969,894 B2 | 6/2011 | Mangal | |
| 8,065,317 B2 | 11/2011 | Wang et al. | |
| 8,116,213 B2 | 2/2012 | Krygowski | |
| 8,174,996 B2 | 5/2012 | Omar | |
| 8,208,389 B2 | 6/2012 | Alaria | |
| 8,244,909 B1 | 8/2012 | Hanson et al. | |
| 8,291,077 B2 | 10/2012 | I'Anson | |
| 2002/0003775 A1 | 1/2002 | Nakano et al. | |
| 2002/0067693 A1 | 6/2002 | Kodialam et al. | |
| 2002/0073375 A1 | 6/2002 | Hollander | |
| 2002/0083186 A1 | 6/2002 | Stringer | |
| 2003/0053419 A1 | 3/2003 | Kanazawa et al. | |
| 2003/0072269 A1 | 4/2003 | Teruhi et al. | |
| 2003/0097438 A1 | 5/2003 | Bearden et al. | |
| 2003/0110276 A1 | 6/2003 | Riddle | |
| 2003/0137972 A1 | 7/2003 | Kowalewski | |
| 2003/0142680 A1 * | 7/2003 | Oguchi | 370/400 |
| 2003/0163772 A1 | 8/2003 | Jaworski | |
| 2003/0165114 A1 | 9/2003 | Kusama et al. | |
| 2003/0208616 A1 | 11/2003 | Laing et al. | |
| 2003/0219022 A1 | 11/2003 | Dillon et al. | |
| 2003/0220971 A1 | 11/2003 | Kressin | |
| 2003/0225549 A1 | 12/2003 | Shay et al. | |
| 2004/0008715 A1 | 1/2004 | Barrack et al. | |
| 2004/0052257 A1 | 3/2004 | Abdo et al. | |
| 2004/0073690 A1 | 4/2004 | Hepworth et al. | |
| 2004/0114539 A1 | 6/2004 | Beshai et al. | |
| 2004/0125965 A1 | 7/2004 | Alberth et al. | |
| 2004/0170163 A1 | 9/2004 | Yik et al. | |
| 2004/0184323 A1 | 9/2004 | Mori et al. | |
| 2004/0193709 A1 | 9/2004 | Selvaggi et al. | |
| 2004/0218617 A1 | 11/2004 | Sagfors | |
| 2004/0223458 A1 | 11/2004 | Gentle | |
| 2004/0240431 A1 | 12/2004 | Makowski et al. | |
| 2004/0252646 A1 | 12/2004 | Adhikari et al. | |
| 2005/0036519 A1 | 2/2005 | Balakrishnan et al. | |
| 2005/0105474 A1 | 5/2005 | Metzler | |
| 2005/0111487 A1 | 5/2005 | Matta et al. | |
| 2005/0117576 A1 | 6/2005 | McDysan et al. | |
| 2005/0152406 A2 | 7/2005 | Chauveau | |
| 2005/0216599 A1 | 9/2005 | Anderson et al. | |
| 2005/0220123 A1 * | 10/2005 | Wybenga et al. | 370/400 |
| 2005/0226172 A1 | 10/2005 | Richardson | |
| 2005/0243733 A1 | 11/2005 | Crawford et al. | |
| 2005/0246041 A1 | 11/2005 | Kreifeldt et al. | |
| 2005/0259597 A1 * | 11/2005 | Benedetto et al. | 370/254 |
| 2005/0283639 A1 | 12/2005 | Le Pennec et al. | |
| 2005/0286419 A1 | 12/2005 | Joshi et al. | |
| 2005/0286436 A1 | 12/2005 | Flask | |
| 2006/0018333 A1 | 1/2006 | Windisch et al. | |
| 2006/0041431 A1 | 2/2006 | Maes | |
| 2006/0098586 A1 | 5/2006 | Farrell et al. | |
| 2006/0104217 A1 | 5/2006 | Lehane | |
| 2006/0104306 A1 | 5/2006 | Adamczyk et al. | |
| 2006/0112400 A1 | 5/2006 | Zhang et al. | |
| 2006/0122835 A1 | 6/2006 | Huart et al. | |
| 2006/0133286 A1 | 6/2006 | Elie-Dit-Cosaque et al. | |
| 2006/0140136 A1 | 6/2006 | Filsfils et al. | |
| 2006/0159029 A1 | 7/2006 | Samuels et al. | |
| 2006/0179338 A1 | 8/2006 | Sumner | |
| 2006/0215684 A1 | 9/2006 | Capone | |
| 2006/0250967 A1 | 11/2006 | Miller et al. | |
| 2006/0268742 A1 | 11/2006 | Chu et al. | |
| 2006/0274760 A1 | 12/2006 | Loher | |
| 2006/0280130 A1 | 12/2006 | Nomura et al. | |
| 2006/0291385 A1 | 12/2006 | Yang | |
| 2007/0041335 A1 | 2/2007 | Znamova et al. | |
| 2007/0058571 A1 | 3/2007 | Rose | |
| 2007/0064616 A1 | 3/2007 | Miranda et al. | |
| 2007/0107034 A1 | 5/2007 | Gotwals | |
| 2007/0127395 A1 | 6/2007 | Jain et al. | |
| 2007/0150480 A1 | 6/2007 | Hwang et al. | |
| 2007/0153774 A1 | 7/2007 | Shay et al. | |
| 2007/0171835 A1 | 7/2007 | Gobara et al. | |
| 2007/0204017 A1 | 8/2007 | Maes | |
| 2007/0212065 A1 | 9/2007 | Shin et al. | |
| 2007/0223462 A1 | 9/2007 | Hite et al. | |
| 2007/0258359 A1 | 11/2007 | Ogasawara et al. | |
| 2007/0263554 A1 * | 11/2007 | Finn | 370/256 |
| 2007/0286165 A1 | 12/2007 | Chu et al. | |
| 2008/0031149 A1 | 2/2008 | Hughes et al. | |
| 2008/0031154 A1 | 2/2008 | Niazi et al. | |
| 2009/0022069 A1 | 1/2009 | Khan et al. | |
| 2009/0028044 A1 | 1/2009 | Windisch et al. | |
| 2009/0059800 A1 * | 3/2009 | Mohan | 370/241.1 |
| 2009/0080334 A1 | 3/2009 | DeCusatis et al. | |
| 2009/0125595 A1 | 5/2009 | Maes | |
| 2009/0144403 A1 | 6/2009 | Sajassi et al. | |
| 2009/0175274 A1 * | 7/2009 | Aggarwal et al. | 370/390 |
| 2009/0193057 A1 | 7/2009 | Maes | |
| 2009/0201937 A1 * | 8/2009 | Bragg et al. | 370/401 |
| 2009/0219823 A1 | 9/2009 | Qian et al. | |
| 2009/0219836 A1 | 9/2009 | Khan et al. | |
| 2009/0274153 A1 * | 11/2009 | Kuo et al. | 370/392 |
| 2009/0296588 A1 | 12/2009 | Nishi et al. | |
| 2009/0328051 A1 | 12/2009 | Maes | |
| 2010/0049826 A1 | 2/2010 | Maes | |
| 2010/0061254 A1 | 3/2010 | Thottakkara et al. | |
| 2010/0061269 A1 | 3/2010 | Banerjee et al. | |
| 2010/0069052 A1 | 3/2010 | Ahomaki et al. | |
| 2010/0182937 A1 | 7/2010 | Bellagamba | |
| 2010/0189118 A1 | 7/2010 | Nonaka | |
| 2010/0226244 A1 | 9/2010 | Mizutani et al. | |
| 2010/0302936 A1 | 12/2010 | Jain et al. | |
| 2011/0019678 A1 * | 1/2011 | Mehta et al. | 370/401 |
| 2011/0134804 A1 | 6/2011 | Maes | |
| 2011/0194403 A1 | 8/2011 | Sajassi | |
| 2012/0106339 A1 | 5/2012 | Mishra et al. | |
| 2012/0106358 A1 | 5/2012 | Mishra et al. | |
| 2012/0224510 A1 | 9/2012 | Bulusu et al. | |

OTHER PUBLICATIONS

IEEE Standards Department, "Virtual Bridged Local Area Networks—Amendment 6: Provider Backbone Bridges—IEEE P802.1ah/D4.2," ©2008, Institute of Electrical and Electronics Engineers, Inc., Mar. 26, 2008; 116 pages.

PCT "International Preliminary Report on Patentability (dated Jan. 26, 2010; 1 page) and Written Opinion of the International Searching Authority and International Search Report (dated Oct. 2, 2008; 7 pages)," for PCT International Application PCT/US2008/070243.

U.S. Appl. No. 13/152,300, filed Jun. 2, 2011, entitled "System and Method for Managing Network Traffic Disruption," Inventor(s): Shekher Bulusu, et al.

U.S. Appl. No. 13/077,828, filed Mar. 31, 2011 entitled "System and Method for Probing Multiple Paths in a Network Environment," Inventor(s): Hariharan Balasubramanian, et al.

U.S. Appl. No. 13/160,957, filed Jun. 15, 2011, entitled "System and Method for Providing a Loop Free Topology in a Network Environment," Inventor(s): Shekher Bulusu, et al.

Andreasan et al., "RTP No-Op Payload Format," Internet Draft, Internet Engineering Task Force, Feb. 2004, pp. 1-8.

Callon et al., "A Framework for Multiprotocol Label Switching," IETF Network Working Group, Internet Draft draft-ietf-mpls-framework-02.txt, Nov. 21, 1997.

Cheng, Jin et al., "Fast TCP: Motivation, Architecture, Algorithms, Performance," Aug. 2, 2004, 44 pages.

Deering, S., et al., "Internet Protocol Version 6," RFC 1883, Dec. 1995.

Fedyk, D., et al., ISIS Extensions Supporting IEEE 802.1aq Shortest Path Bridging, Network Working Group Internet Draft, Mar. 8, 2011, 42 pages; http://tools.ietf.org/html/draft-ietf-isis-ieee-aq-05.

(56) References Cited

OTHER PUBLICATIONS

Feldman, N., "ARIS Specification," Internet Draft, Mar. 1997.
Gobrial, Margret N., "Evaluation of Border Gateway Protocol (BGP) Version 4(V4) in the Tactical Environment", Military Communications Conference, Oct. 21-24, 1996; Abstract Only http://ieeexplore.ieee.org/xpl.login.jsp?tp=&arnumber=569372&url=http%3A%2F%2Fieeexplore.ieee.org%2Fiel3%2F4198%2F12335%2F00569372.pdf%3Farnumber%3D569372.
Halabi, Bassam, *Internet Routing Architectures* (CISCO), Macmillan Technical Publishing, Apr. 23, 1997; Abstract and Table of Contents only. http://www.ciscopress.com/store/internet-routing-architectures-cisco-9781562056520.
Handley, et al., "SDP: Session Description Protocol," RFC 2327, Apr. 1998, 43pgs.
Heinanen, J., "Multiprotocol Encapsulation over ATM Adaptation Layer 5," RFC 1483, Network Working Group, Jul. 1993; www.ietf.org.
IEEE Standards Department, "Virtual Bridged Local Area Networks—Amendment 9: Shortest Path Bridging—IEEE P802.1aq/D2.1," ©2009, Institute of Electrical and Electronics Engineers, Inc., Aug. 21, 2009; 208 pages.
Jennings, C., "NAT Classification Test Results," Internet Draft draft-jennings-behave-test-results--02.txt, Jun. 25, 2006.
Katsube, Y. et al., "Toshiba's Router Architecture Extensions for ATM: Overview," RFC 2098, Network Working Group, Feb. 1997; www.ietf.org.
Kessler, G., "Chapter 2.2 PING of TCP: A Primer on Internet and TCP/IP Tools," RFC 1739; Network Working Group, Dec. 1994; www.ietf.org.
Kompella, K. and G. Swallow, "Detecting Multi-Protocol Label Switched (MPLS) Data Plane Failures," Network Working Group, RFC 4379, Feb. 2006, 52 pages; http://tools.ietf.org/pdf/rfc4379.pdf.
Laubach, M., "Classical IP and ARP over ATM," RFC 1577, Internet Working Group, Jan. 1994; www.ietf.org.
Laubach, M., "IP over ATM Working Group's Recommendations for the ATM Forum's Multiprotocol BOF Version 1," RFC 1754, Network Working Group, Jan. 1995; www.ietf.org.
Liao et al., "Adaptive Recovery Techniques for Real-time Audio Streams," IEEE INFOCOM2001; Twentieth Annual Joint Conference of the IEE Computer and Communications Societies Proceedings, Apr. 22-26, 2001, vol. 2, pp. 815-823.
Malkin, G., "Traceroute Using an IP Option," Network Working Group, RFC 1393, Jan. 1993, 8 pages; http://tools.ietf.org/pdf/rfc1393.pdf.
McGovern, M., et al., "CATNIP: Common Architecture for the Internet," RFc 1707, Network Working Group, Oct. 1994; www.ietf.org.
Nagami, K., et al., "Toshiba's Flow Attribute Notification Protocol (FANP) Specification," RFC 2129, Network Working Group, Apr. 1997; www.ietf.org.
Newman, P. et al., "Ipsilon Flow Management Protocol Specification for IPv4 Version 1.0," RFC 1953, Network Working Group, May 1996; www.ietf.org.
Newman, P. et al., "Ipsilon's General Switch Management Protocol Specification Version 1.1," RFC 1987, Network Working Group, Aug. 1996; www.ietf.org.
Niccolini, S., et al. "How to store traceroute measurements and related metrics," Internet Draft draft-niccolini-ippm-storetraceroutes-02.txe., Oct. 24, 2005.
PCT Jan. 20, 2009 International Preliminary Report on Patentability and Written Opinion of the International Searching Authority for PCT/US2007/015506.
PCT Feb. 7, 2008 International Search Report for PCT/US2007/015506.
Perez, M., et al., "ATM Signaling Support for IP over ATM," RFC 1755, Network Working Group, Feb. 1995; www.ietf.org.
Perlman, et al., "Rbridges: Base Protocol Specification," IETF Draft, Jan. 2009.
Perlman, Radia, "Rbridges: Transparent Routing," in Proc. IEEE INFOCOM, Mar. 2004.
Rosen et al., "A Proposed Architecture for MPLS," IETF Network Working Group, Internet Draft draft-ietf-mpls-arch-00.txt, Aug. 1997.
Rosen et al., "MPLS Label Stock Encoding," RFC 3032, Network Working Group, Jan. 2001; www.ietf.org.
Rosenberg et al., "STUN—Simple Traversal of User Datagram Protocol (UDP) Through Network Address Translators (NATs)," Network Working Group, RFC 3489, Mar. 2003, 44 pgs.
Schulzrinne, H., et al., "RTP, A Transport Protocol for Real-Time Applications," Network Working Group RFC3550, Jul. 2003, 98 pages.
Smith, Bradley R., et al., "Securing the Border Gateway Routing Protocol," Global Telecommunications Conference, Nov. 18-22, 1996.
Touch, et al., Transparent Interconnection of Lots of Links (TRILL): Problem and Applicability Statement, RFC 5556, IETF, May 2009.
Townsley, et al., "Layer Two Tunneling Protocol, L2TP," Network Working Group, RFC 2661, Aug. 1999, 75 pages.
Ullman, R., "Rap: Internet Route Access Protocol," RFC 1476, Network Working Group, Jun. 1993; www.ietf.org.
Viswanathan et al., "ARIS: Aggregate Route-Based IP Switching," Internet Draft, Mar. 1997.
Wang, Q. et al., "TCP-Friendly Congestion Control Schemes in the Internet," National Key Lab of Switching Technology and Telecommunication Networks, Beijing University of Posts & Telecommunications; 2001, pp. 211-216; http://www.sics.se/~runtong/11.pdf.
Wikipedia, "IEEE 802.1ag," Connectivity Fault Management, retrieve and printed Nov. 2, 2010, 4 pages; http://en.wikipedia.org/wiki/IEEE_802.1ag.
Woundy et al., "ARIS: Aggregate Route-Based IP Switching," Internet Draft draft-woundy-aris-ipswitching-00-txt, Nov. 1996.
USPTO Mar. 26, 2013 Non-Final Office Action from U.S. Appl. No. 13/077,828.
USPTO Nov. 26, 2012 Non-Final Office Action from U.S. Appl. No. 12/938,237.
USPTO Feb. 22, 2013 Response to Nov. 26, 2012 Non-Final Office Action from U.S. Appl. No. 12/938,237.
USPTO Mar. 26, 2013 Final Office Action from U.S. Appl. No. 12/938,237.
USPTO Jan. 7, 2013 Non-Final Office Action from U.S. Appl. No. 13/160,957.
USPTO Apr. 2, 2013 Response to Non-Final Office Action dated Jan. 7, 2013 from U.S. Appl. No. 13/160,957.
USPTO May 8, 2013 Final Office Action from U.S. Appl. No. 13/160,957.
USPTO Jun. 20, 2013 Non-Final Office Action from U.S. Appl. No. 13/041,148.
USPTO Jul. 5, 2013 Non-Final Office Action from U.S. Appl. No. 13/152,200.
USPTO Aug. 26, 2013 Response to Jun. 20, 2013 Non-Final Office Action from U.S. Appl. No. 13/041,148.
USPTO Jun. 13, 2013 RCE Response to Mar. 26, 2013 Final Office Action from U.S. Appl. No. 12,938,237.
USPTO Jul. 19, 2013 Non-Final Office Action from U.S. Appl. No. 12,938,237.
USPTO Aug. 6, 2013 RCE Response to May 8, 2013 Final Office Action from U.S. Appl. No. 13/160,957.

* cited by examiner

SYSTEM AND METHOD FOR PROVIDING A LOOP FREE TOPOLOGY IN A NETWORK ENVIRONMENT

TECHNICAL FIELD

This disclosure relates in general to the field of communications and, more particularly, to providing a loop free topology in a network environment.

BACKGROUND

Ethernet architectures have grown in complexity in recent years. This is due, at least in part, to diverse technologies that have emerged to accommodate a plethora of end users. For example, Data Center Ethernet (DCE) represents an extension to Classical Ethernet (CE), and it can offer a lower cost, lower latency, high-bandwidth configuration. The forwarding methodology adopted by DCE networks is generally scalable and, further, provides forwarding paths with equal-cost multipathing with support for different forwarding topologies. In certain network scenarios, topology information may not be current, accurate, and/or consistent. Optimally managing network topologies presents a significant challenge to system designers, network operators, and service providers alike.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DETAILED DESCRIPTION OF EXAMPLE EMBODIMENTS

Overview

A method is provided in one example embodiment and includes executing an intermediate system to intermediate system (IS-IS) protocol for a first set of network links in a network. The method also includes executing a spanning tree protocol (STP) for a second set of network links, and generating a network topology that includes using a broadcast tree system identifier (ID) as a root bridge ID for the network. The method further includes communicating the root bridge ID to a neighboring network element. In more specific examples, an STP block is communicated to a redundant link, which connects a first switch and a second switch. The first and second switches can converge on the network topology using the broadcast tree system ID.

In more particular examples, the network includes a Data Center Ethernet (DCE) network and a Classical Ethernet (CE) network, which form a layer-2 (L2) broadcast domain. The broadcast tree system ID can be associated with the IS-IS protocol, and the root bridge ID is associated with the STP. A selected gateway port is configured to receive a superior Bridge Protocol Data Unit (BPDU), and in response to the superior BPDU, the selected port can be placed in a blocked state. In other embodiments, the broadcast tree system ID is provided as the root bridge ID per virtual local area network (VLAN), and the broadcast tree system ID is a Media Access Control address (MAC address).

Example Embodiments

Figure 1:
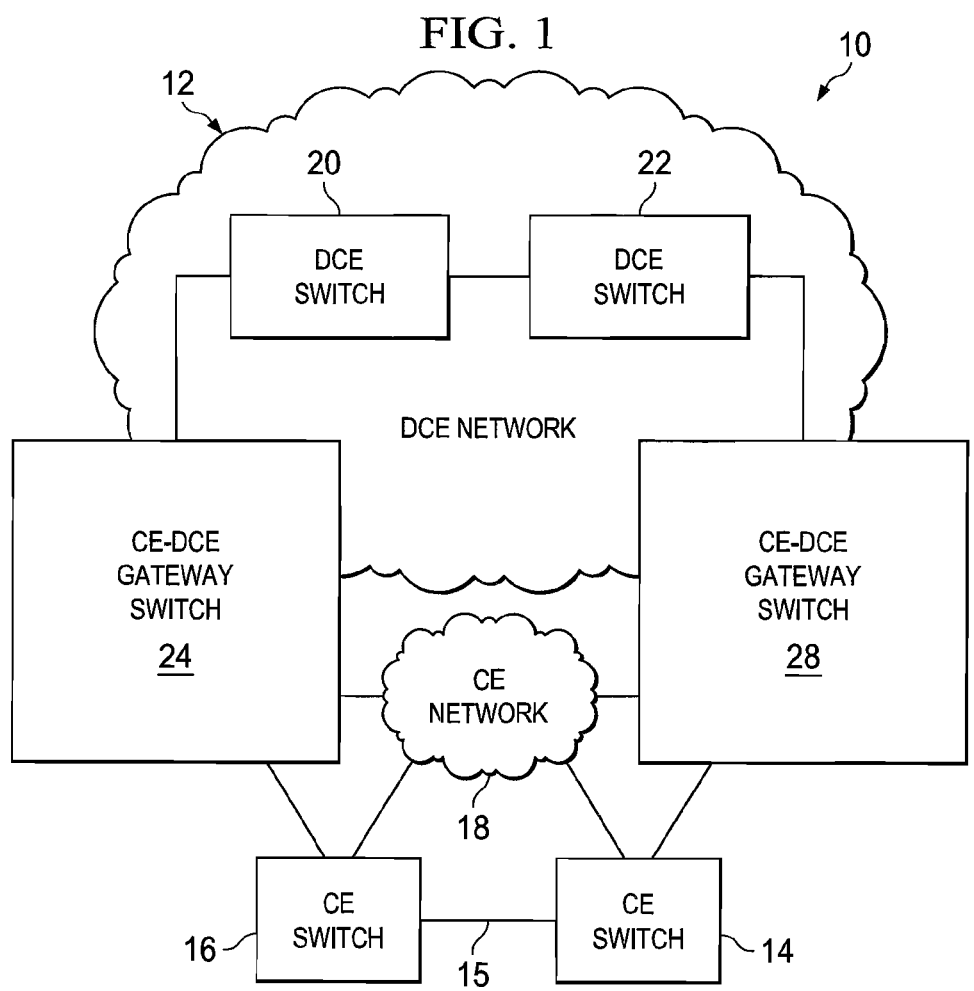
FIG. 1 is a simplified block diagram of a communication system for providing a loop free topology in a network environment in accordance with one embodiment of the present disclosure.

Turning to FIG. 1, FIG. 1 is a simplified block diagram of a communication system 10 for providing a loop free topology in a network environment in accordance with one embodiment. FIG. 1 may include a Data Center Ethernet (DCE) network 12, a Classical Ethernet (CE) switch 14 and a CE switch 16, which can be coupled together via a communication link 15. Additionally, FIG. 1 may include a CE network 18, a set of DCE switches 20 and 22, along with a set of CE-DCE gateway switches 24 and 28.

DCE networks commonly use a routing protocol (e.g., intermediate system to intermediate system (IS-IS)) for forwarding purposes, where CE networks commonly use a spanning tree protocol (STP) as their forwarding protocol. DCE and CE form the same layer-2 (L2) broadcast domain such that a mechanism is needed to avoid the loop that forms across interconnected CE and DCE networks. In the illustration of FIG. 1, DCE switches 20 and 22 can be executing an IS-IS protocol. Concurrently, CE-DCE switches 24 and 28 can be employing the IS-IS protocol on DCE links, and using STP on the CE links. In this particular configuration of FIG. 1, CE switch 16 may be executing STP. In regards to the example of FIG. 1, a loop could exist, where the path is defined from CE switch 16, to CE-DCE switch 24, to DCE switch 20, to DCE switch 22, to CE-DCE switch 28, to CE switch 14, and then returning back to CE switch 16.

In one particular example, DCE network 12 is representative of a layer 2 (L2) multi-pathing (L2MP) network, which may be executing the IS-IS forwarding protocol. DCE network 12 and CE network 18 are associated with the same broadcast domain. This could mean, for example, that a virtual local area network (VLAN) associated with CE network 18 can span into DCE network 12. Because of their inherent protocols, if a loop occurs between DCE network 12 and CE network 18, it is not properly blocked. This is because protocols fail to uniformly evaluate both of these networks, as a collective whole.

In order to prevent loops in DCE/CE hybrid networks, communication system 10 can provide an L2 gateway spanning tree protocol (L2G-STP) mechanism and an L2 Gateway Interconnect Protocol (L2GIP) mechanism. As an overview, L2G-STP can ensure a loop-free CE-DCE L2 domain, while L2GIP can offer extended capabilities to L2G-STP, as discussed below. In a general sense, the main functionality of the L2G-STP mechanism is to offer a segmented spanning tree, whereas the main functionality of the L2GIP mechanism is to build (and to maintain adjacencies) between CE-DCE gateway switches 24 and 28.

Hence, communication system 10 can be employed to prevent loops from occurring within networks (and/or clouds) of FIG. 1. More particularly, certain embodiments of communication system 10 can represent DCE network 12 as a pseudo bridge, or a virtual switch (as outlined below). Furthermore, embodiments presented herein allow an STP block to be the redundant link between CE switch 16 and CE switch 14. This is commonly referred to as the 'wiring closet' in switching applications. Communication system 10 allows CE-DCE gateway switches (connected to the same DCE network) to be represented as a single virtual switch such that the STP block port is pushed down. This stands in contrast to blocking a core link, which connects gateway switches. Hence, communication system 10 can use a broadcast tree system identifier (e.g., per-VLAN) as the STP root bridge identifier (ID) on the associated CE-DCE gateway switches. This operation would effectively push the STP block to communication link 15, which offers redundancy for the system. The architecture of communication system 10 can offer seamless interoperability with existing Ethernet switches and end devices.

In terms of advantages, any possible user provisioning for the CE-DCE gateway switches is minimal, when employing the described approach to achieve a virtual switch paradigm. Additionally, such a strategy is pragmatic because it is less prone to errors and, further, because it reduces debugging operations. Moreover, an object is locally derived using IS-IS (instead of STP), which explicitly synchronizes the virtual switch information across CE-DCE gateway switches 24 and 28 in DCE network 12. Note that such a solution is simple to implement and, furthermore, transient loops would be avoided whenever DCE network 12 would split, change, or merge with another entity. Details relating to the possible signaling and interactions between the components of communication system 10 are provided below with reference to FIGS. 2-6.

Note that before turning to the example flows and infrastructure of example embodiments of the present disclosure, a brief overview of the switching environment is provided for purposes of context and explanation. Link state routing is a protocol that allows a node in a network to determine network topology by sharing information about a transmission cost to each of its neighboring nodes. Link state routing packets are transmitted to (and received from) neighbors. The least expensive path to various destinations can be determined using the link state information. Link state information can be used to generate network topology information at various network nodes for creating forwarding tables. The forwarding tables allow network nodes (such as switches and bridges) to forward the received traffic on an appropriate output interface. In order to generate a network topology map and a forwarding table at a specific node, link state information is distributed from various network nodes. Each network node is configured to create a link state packet having information about the distance, delay, or cost to each of its neighbors. A link state record (LSR) can then be transmitted to neighboring nodes.

Transient loops arise when network topology changes because neighboring nodes may not be forwarding transmissions using the same generated network topology. Transient and permanent loops waste network bandwidth and, further, may burden end nodes with duplicate copies of topology information. One mechanism for preventing loops is STP. STP commonly runs on a switch and, further, operates to maintain a loop-free topology in an L2 switched network. The term spanning tree protocol (STP) as used herein includes any version of STP, including for example, traditional STP (IEEE 802.1d), rapid spanning tree protocol (RSTP) (IEEE 802.1w), multiple spanning tree protocol (MSTP) (IEEE 802.1s), or any other spanning tree protocol. CE switches may use STP to prevent loops, whereas other devices such as DCE switches may be configured to use protocols other than STP (e.g., IS-IS) to provide loop-free operations. While STP and other protocols work well for a standalone network comprising switches that utilize only one protocol for preventing loops, the different protocols may not interoperate with each other and, therefore, cannot effectively be used in a combined (i.e., a hybrid) network.

FIG. 1 depicts clouds that form a switching network, where a cloud is defined as a set of one of more network switches/bridges and end hosts: all of which may be interconnected. At the edge of a DCE cloud and a CE cloud, a model for control plane interaction between the two clouds is commonly defined. Specifically, DCE and CE use different protocols to construct their respective forwarding topology (IS-IS versus STP). Thus, even though a single L2 broadcast domain would span the clouds, two different protocols govern the determination of the forwarding topology. This is especially important for the behavior of broadcast traffic (e.g., frames with an unknown Media Access Control address (MAC address) address are flooded using broadcast throughout the network). The inconsistency in topology creates an opportunity for problematic loops to develop. One immediate issue surfaces as to which of the two clouds (DCE or CE) has the responsibility to detect and to break the loops in the broadcast domain.

In certain embodiments, communication system 10 interoperates with STP at the CE cloud level and interacts with IS-IS in an interlock manner at the DCE cloud level to prevent transient loops. Operationally, CE-DCE gateway switches 24 and 28 can be configured to send out the same STP root bridge ID. Stated in different terminology, CE-DCE gateway switches 24 and 28 can virtualize the STP root inside the DCE network. In more specific implementations, the STP mechanism being executed on CE-DCE gateway switches 24 and 28 can use the IS-IS broadcast tree system ID (which may be operating on the DCE links) as the STP root bridge ID. Certain routing protocols (e.g., IS-IS) provide that gateway switches 24 and 28 (after IS-IS converges) should derive their topology at the same root switch (and, therefore, the same system ID). STP on both gateway switches 24 and 28 can advertise the same STP root bridge ID and, hence, the STP block can be pushed down to a redundant link 15, which connects CE switch 16 and CE switch 14 (i.e., the wiring closet).

In a general sense, the STP being executed on a given CE-DCE gateway switch uniformly enforces the STP root that is within DCE network 12. Further, communication system 10 can prevent a loop by enforcing the STP being executed on CE-DCE gateway switches 24 and 28 in order to block the port when it receives a superior STP Bridge Protocol Data Unit (BPDU) from CE network 12. Hence, in an example of FIG. 1, CE-DCE gateway switches 24 and 28 can block the link between gateway switch 24 and CE switch 16 (or between gateway switch 28 and CE switch 14) if they receive a superior BPDU from CE switch 16, or from CE switch 14. Such an operation could effectively prevent the CE-DCE L2 network loops. The notion is to uniformly enforce that STP root that is within DCE network 12.

A given gateway that has connectivity to both CE network 18 and DCE network 12 can be referred to as an L2 gateway switch. In essence, such switches should use the same information in their STP BPDUs. In this sense, the gateway switches (connected to both networks) would view DCE network 12 as a virtual switch. In one particular example, communication system 10 can be provisioned to leverage the IS-IS broadcast tree system ID (e.g., per-VLAN) as the STP root bridge ID on CE-DCE gateway switches 24 and 28. For example, the MAC address of the broadcast tree can be used by CE-DCE gateway switches 24 and 28. In using such a mechanism, the gateway switches that are executing the IS-IS protocol would eventually converge at one root system ID (e.g., one broadcast tree ID, one root MAC address, etc.). Hence, all the gateway switches would communicate BPDUs with the same root bridge ID. This allows the network to represent DCE network 12 as a single switch. Before turning to some of the additional operations of this architecture, a brief discussion is provided about some of the infrastructure of the architecture, which is depicted by FIG. 2.

Figure 2:
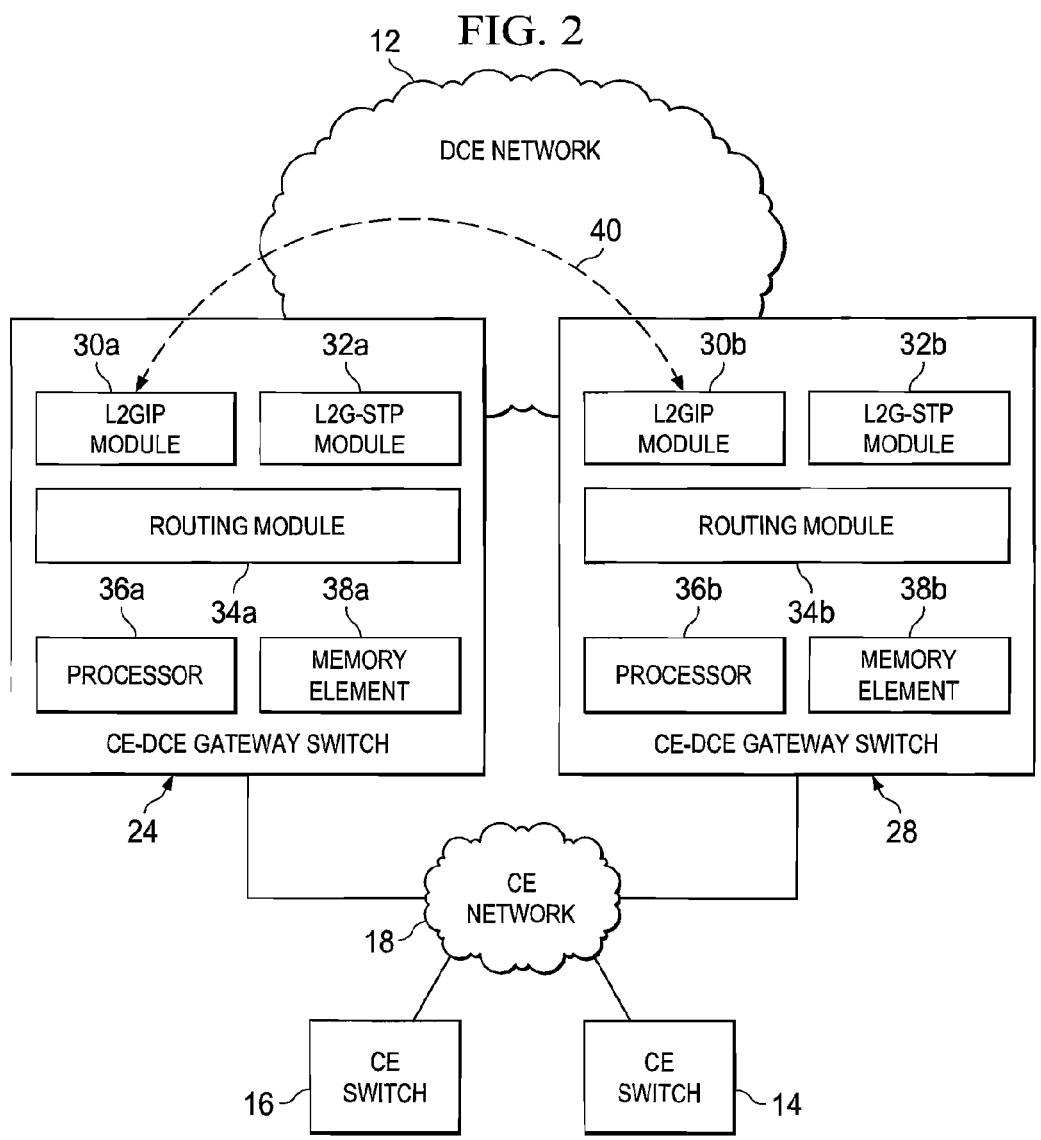
FIG. 2 is a simplified block diagram illustrating additional details related to the communication system in accordance with one embodiment.

FIG. 2 is a simplified block diagram illustrating potential details associated with communication system 10. In this particular example, CE-DCE gateway switches 24 and 28 include a respective processor 36a-b, a respective memory element 38a-b, a respective L2GIP module 30a-b, a respective L2G-STP module 32a-b, and respective routing modules 34a-b (e.g., IS-IS routing modules). Also included in FIG. 2 is a dashed line 40, which depicts L2GIP adjacency being built between CE-DCE gateway switches 24 and 28 (e.g., using an IS-IS protocol). Note also that L2GIP modules 30a-b may readily be incorporated into respective L2G-STP modules 32a-b in different embodiments (or vice versa), or routing modules 34a-b can be part of hybrid configurations in which any of the modules of FIG. 2 are suitable consolidated, combined, etc.

DCE network 12 and CE network 18 represent a series of points or nodes of interconnected communication paths for receiving and transmitting packets of information that propagate through communication system 10. These networks offer a communicative interface between network elements (e.g., switches, bridges, gateways, etc.) and may be any IP network, local area network (LAN), virtual LAN (VLAN), wireless LAN (WLAN), metropolitan area network (MAN), wide area network (WAN), extranet, Intranet, virtual private network (VPN), or any other appropriate architecture or system that facilitates communications in a network environment. The networks can support a transmission control protocol (TCP)/IP, or a user datagram protocol (UDP)/IP in particular embodiments of the present disclosure; however, these networks may alternatively implement any other suitable communication protocol for transmitting and receiving data packets within communication system 10.

DCE switches 20, 22 and CE-DCE gateway switches 24, 28 are network elements that route (or that cooperate with each other in order to route) traffic and/or packets in a network environment. As used herein in this Specification, the term 'network element' is meant to encompass switches, routers, gateways, bridges, loadbalancers, firewalls, inline service nodes, proxies, servers, processors, modules, or any other suitable device, component, element, or object operable to exchange information in a network environment. This network element may include any suitable hardware, software, components, modules, interfaces, or objects that facilitate the operations thereof. This may be inclusive of appropriate algorithms and communication protocols that allow for the effective exchange (reception and/or transmission) of data or information. DCE switches 20 and 22 are L2MP core switches in one particular example. At a point in time, DCE switches 20 and 22, along with CE-DCE gateway switches 24 and 28, converge at one IS-IS broadcast tree. CE-DCE gateway switches 24 and 28 can share the same perspective of the network via STP BPDUs.

In operation, L2G-STP modules 32a-b are configured to terminate an STP instance at respective CE-DCE gateway switches 24 and 28. L2G-STP defines the ports to be provided in one of the following L2 gateway port types: a backbone gateway port (i.e., default gateway port type), and an uplink gateway port. Switches commonly have a priority list, which can be influenced by configuration, updates, information from its peers, etc. Upon receiving a superior BPDU, a given switch can compare its local priority list to this received information.

DCE addressing and forwarding can include the use of a locally assigned aggregatable (or hierarchical) MAC address for forwarding activities. Edge switches can maintain a mapping between the classical MAC address and the corresponding hierarchical MAC address. The mapping can be established via learning between the network elements, where use of a MAC-in-MAC header can be employed to carry the hierarchical MAC address across the DCE network. A link state protocol can be used to determine the forwarding topology and, further, to support shortest path and equal cost multi-path forwarding for unicast traffic. Multicast frames can also readily use multi-pathing, albeit using a slightly different scheme. Additionally, a single control protocol can be used to compute unicast paths, multicast path, and broadcast distribution trees.

For the L2G-STP mechanism, and in regards to the backbone gateway port, the STP root backbone inside the DCE cloud is enforced. The backbone gateway port can ensure that it is consistently designated as the superior port. [Note that a backbone network or network backbone is commonly a part of computer network infrastructure that interconnects various pieces of network: providing a path for the exchange of information between different LANs or sub-networks. A backbone can tie together diverse networks in the same building, in different buildings in a campus environment, over wide areas, etc. Normally, the backbone's capacity is greater than the networks connected to it.] In cases where the backbone gateway port receives a superior STP BPDU, the architecture will respond by placing the port in a gateway port inconsistency blocked state. For the uplink gateway port, the L2G-STP mechanism allows the STP root to be outside the DCE network. In using an auto-detection approach, when receiving superior BPDUs, the backbone port type can transition to an uplink port type. In addition, for an explicit configuration of the uplink port type approach, the uplink gateway port can ensure that it is not the designated superior port. Hence, if the uplink gateway port received an inferior STP BPDU, then the architecture would respond by putting the port in an uplink gateway port inconsistency blocked state.

Note that DCE switches 20, 22 and CE-DCE gateway switches 24, 28 may share (or coordinate) certain processing operations. Using a similar rationale, their respective memory elements may store, maintain, and/or update data in any number of possible manners. In a general sense, the arrangement depicted in FIG. 2 may be more logical in its representations, whereas a physical architecture may include various permutations/combinations/hybrids of these elements. In one example implementation, CE-DCE gateway switches 24, 28 include software (e.g., as part of L2GIP modules 30a-b and/or L2G-STP modules 32a-b) to achieve the switching operations, as outlined herein in this document. In other embodiments, this feature may be provided externally to any of the aforementioned elements, or included in some other network element to achieve this intended functionality. Alternatively, several elements may include software (or reciprocating software) that can coordinate in order to achieve the operations, as outlined herein. In still other embodiments, any of the devices of FIGS. 1-5 may include any suitable algorithms, hardware, software, components, modules, interfaces, or objects that facilitate these switching operations.

Figure 3:
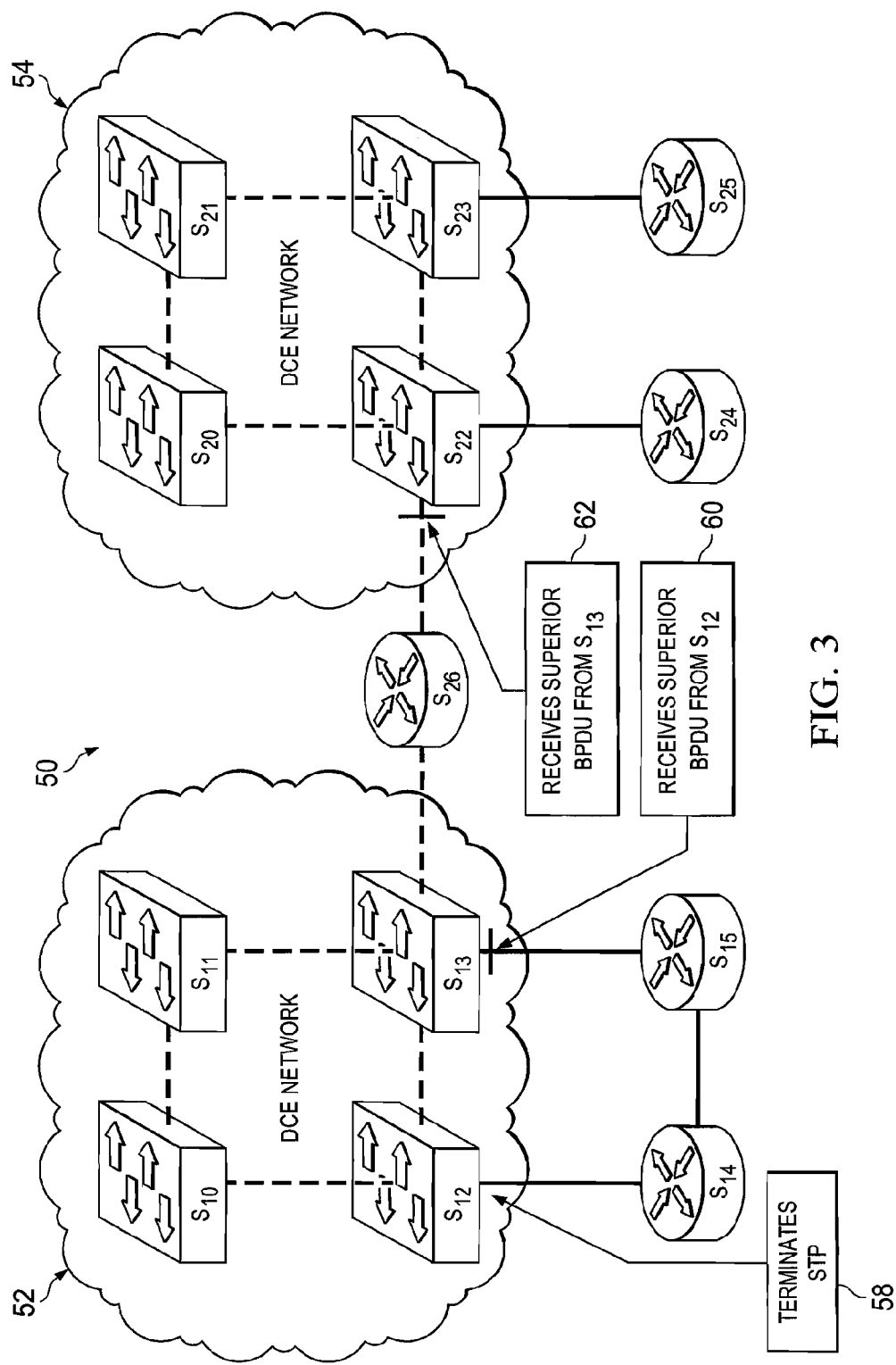
FIG. 3 is a simplified block diagram illustrating details related to a possible example of the communication system in accordance with one embodiment.
Figure 4:
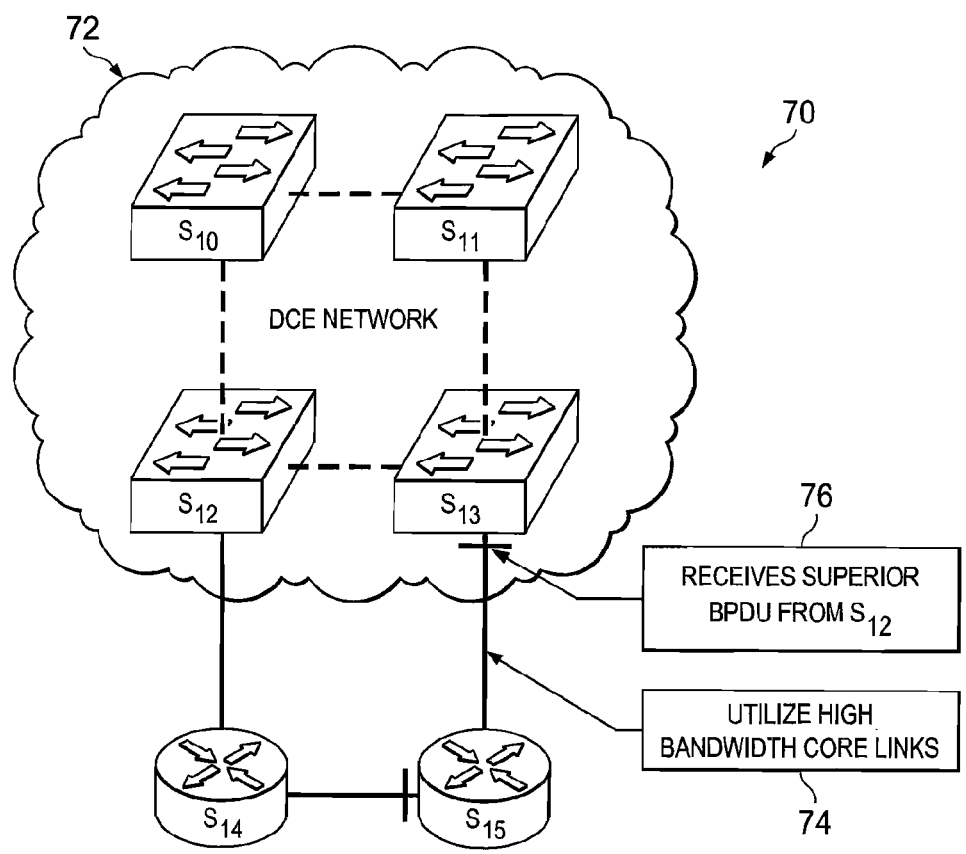
FIG. 4 is a simplified block diagram illustrating details related to a possible example of the communication system in accordance with one embodiment.
Figure 5:
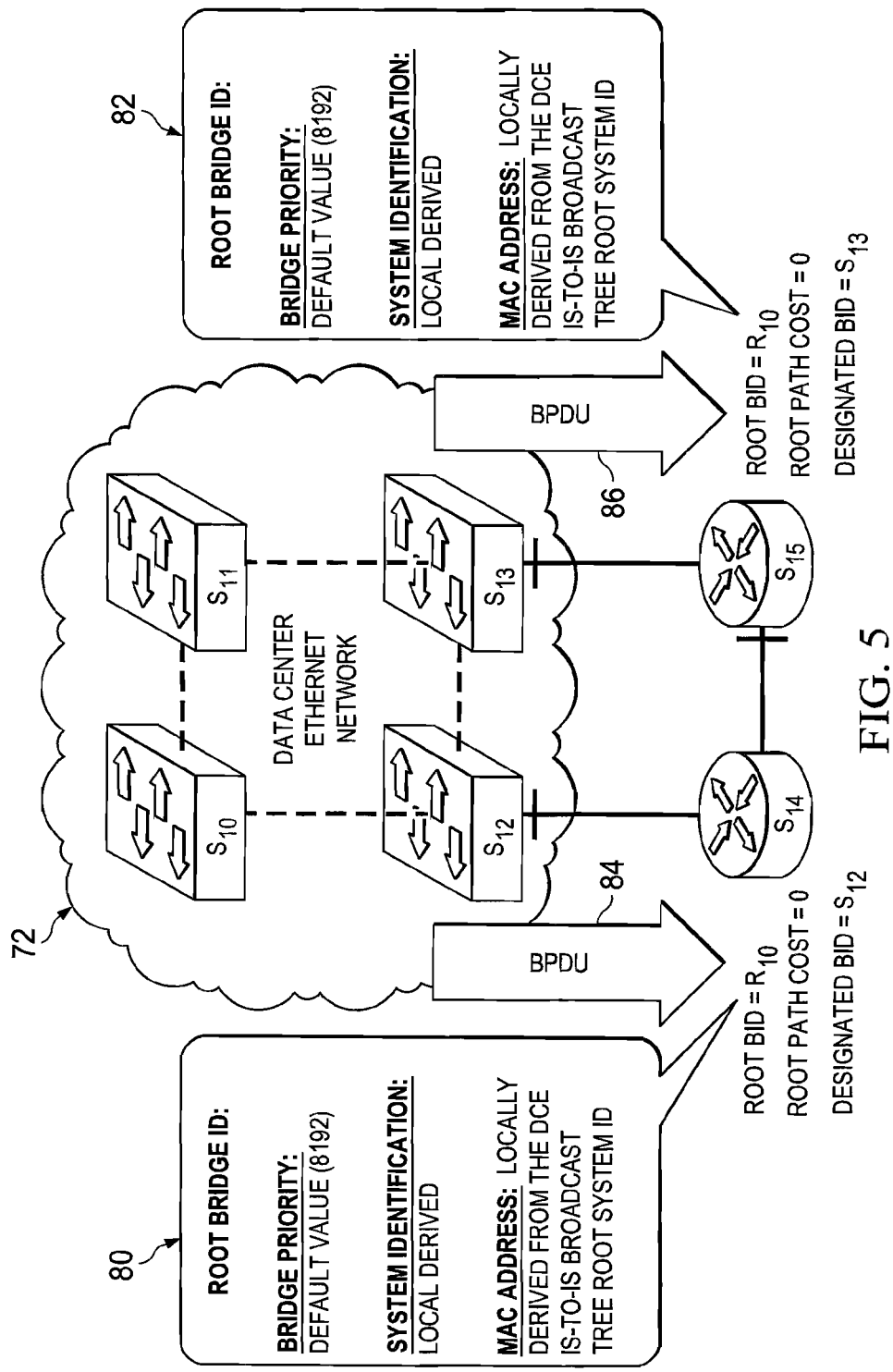
FIG. 5 is a simplified block diagram illustrating details related to a possible example of the communication system in accordance with one embodiment.

FIG. 3 is a simplified block diagram illustrating one example of a segmented spanning tree system 50. FIGS. 3-5 can assist in explaining an example flow for particular switching events and, therefore, these illustrations are discussed together. FIG. 3 includes a set of DCE networks 52 and 54, which include a set of switches and gateways for propagating information in a network environment. Note that each switch group belongs to the same domain. In this particular example, an assumption is made that the STP root is inside the DCE cloud. A given switch (e.g., switch #12) can terminate the STP data, as shown by an element 58. In addition, a peer switch (e.g., switch #13) can receive a superior BPDU from switch #12. This is illustrated by an element 60 of FIG. 3. In addition, switch #22 can receive a superior BPDU from switch #13, as is depicted by an element 62.

In regards to the possible advantages associated with a segmented spanning tree, there is virtually no configuration obligation. Furthermore, there is a smaller, more manageable sized STP in the CE clouds. Such a strategy can also achieve a rapid convergence. No topology change (TC) is needed across the DCE, and there is no STP mechanism or L2GIP required inside the DCE network. Moreover, such an approach avoids concerns about DCE cloud merging, splitting, changing, etc.

Such a segmented spanning tree approach may present certain challenges. For example, the STP block typically is provided at the DCE-CE gateway switch port. It is desirable to utilize a high-bandwidth CE-DCE gateway link, and have the redundant link blocked in the CE wiring closet. Moreover, such an approach may not provide connectivity between DCE clouds using CE. To resolve the issue associated with utilizing CE-DCE links, a locally derived common root bridge ID can be employed. Example operations associated with the common root bridge ID are detailed below with reference to FIG. 4.

FIG. 4 is a simplified block diagram illustrating another example of a segmented spanning tree system 70. In this particular example, a DCE network 72 is provided with a number of switches and gateways for directing network traffic. Each of the switches use the IS-IS broadcast tree system such that information being exchanged between the gateway switches is similar. An element 74 represents the notion of utilizing high bandwidth core links in this example. Note that a link between switch #13 and switch #15 has been blocked in this scenario. This block is problematic because it represents a core link being blocked, which inhibits an optimal bandwidth usage. Furthermore, an element 76 is provided to illustrate that switch #13 receives a superior BPDU from switch #12. The link between switch #14 and switch #15 is also blocked, where this link is representative of the wiring closet. This link is generally provided for redundancy purposes. Ideally, any block should be pushed to this link (i.e., to the wiring closet).

FIG. 5 is a simplified block diagram illustrating example activities associated with segmented spanning tree system 70. This particular illustration is reflective of a locally derived common root bridge ID. Note that there is a better bridge priority in the CE cloud (e.g., if switch #9 were used instead of switch #15, this would be deemed as a misconfiguration). FIG. 5 also illustrates a set of BPDUs 84 and 86. In regards to BPDU 84, the following parameters are configured: Root BID=R10, Root Path Cost=0, and a Designated BID=S12. More specifically, for the root bridge ID, the bridge priority default value is given as 8192. The system ID is locally derived, and the MAC address is locally derived from the DCE IS-IS broadcast tree root system ID. For BPDU 86, the following parameters are configured: Root BID=R10, Root Path Cost=0, and a Designated BID=S13. In terms of the root bridge ID, the bridge priority has a default value of 8192. In addition, the system ID is locally derived, and the MAC address is locally derived from the DCE IS-IS broadcast tree root system ID.

In operation, each gateway switch locally derives a common root bridge ID. The bridge priority field (e.g., 4 bits) of the common root bridge ID can employ administrative control to relocate the STP root. In terms of how a given gateway switch would understand the configured root bridge priority value, there are several possible approaches. In a first approach, a better bridge priority is adapted from the received BPDUs in the case where the MAC address component of the root bridge ID presents a match. In a second approach, a new LSP TLV can be employed to propagate the incremental bridge priority changes.

Such an approach provides the capability to select CE-DCE core links, while pushing the redundant link block down into a CE wiring closet. However, such a strategy may not provide optimal connectivity between DCE clouds via the CE cloud. Furthermore, such a strategy would not have the STP root outside the DCE. To resolve the DCE cloud connectivity issue via the CE and/or to address the STP root outside of DCE, the L2GIP protocol can be used.

Figure 6:
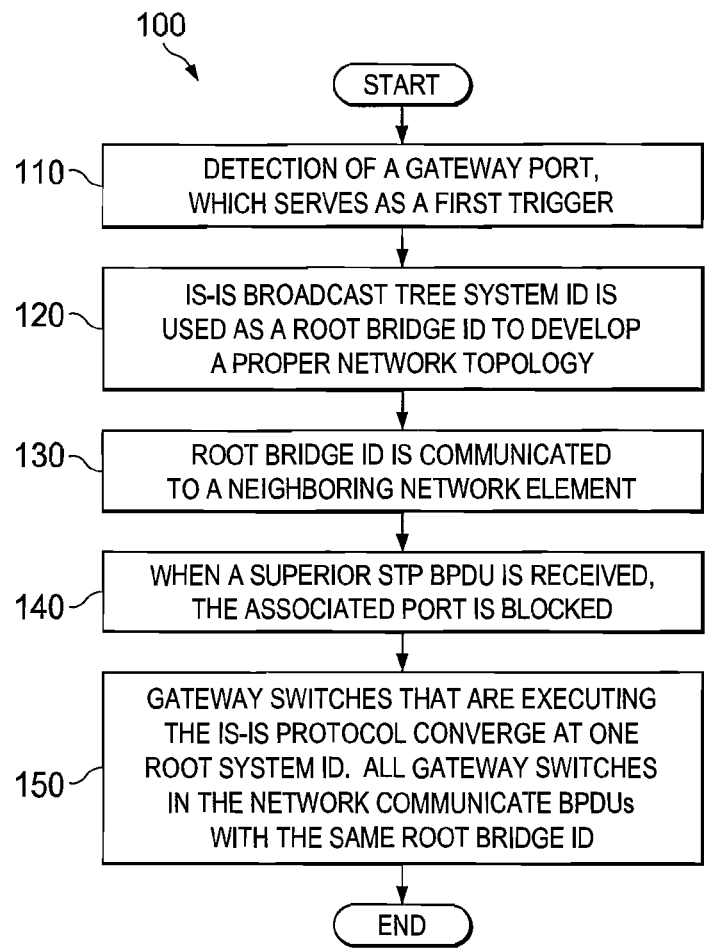
FIG. 6 is a simplified flowchart illustrating a series of example operations for a flow associated with the communication system.

Turning to FIG. 6, FIG. 6 is a simplified flowchart illustrating one example scenario 100 that could be accommodated by communication system 10. The flowchart may begin at 110, where there is a detection of a gateway port, which serves as a first trigger. The typically happens when the first port is up on the CE side of a particular VLAN, and on the L2MP side. This would essentially allow the VLAN to operate as a traffic gateway. At 120, the IS-IS broadcast tree system ID is used as a root bridge ID to develop a proper network topology. At 130, the root bridge ID is communicated to a neighboring network element. At 140, by enforcing the STP being executed on CE-DCE gateway switches, when a superior STP BPDU is received, the port is blocked (which can effectively block particular links between gateway switches, CE switches, etc.). At 150, the gateway switches that are executing the IS-IS protocol would eventually converge at one root system ID (e.g., one broadcast tree ID, one root MAC address, etc.). Hence, all the gateway switches would communicate BPDUs with the same root bridge ID.

Note that in certain example implementations, the switching functions outlined herein may be implemented by logic encoded in one or more non-transitory computer-readable tangible storage media (e.g., embedded logic provided in an application specific integrated circuit (ASIC), digital signal processor (DSP) instructions, software (potentially inclusive of object code and source code) to be executed by a processor, or other similar machine, etc.). In some of these instances, a memory element (as shown in FIG. 2) can store data used for the operations described herein. This includes the memory element being able to store software, logic, code, or processor instructions that can be executed to carry out the activities described in this Specification. A processor can execute any type of instructions associated with the data to achieve the operations detailed herein in this Specification. In one example, the processor (as shown in FIG. 2) could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array (FPGA), an erasable programmable read only memory (EPROM), an electrically erasable programmable ROM (EE- PROM)) or an ASIC that includes digital logic, software, code, electronic instructions, or any suitable combination thereof.

In one example implementation, L2GIP modules 30*a*-*b* and/or L2G-STP modules 32*a*-*b* include software in order to achieve the switching functions outlined herein. These activities can be facilitated by CE-DCE switches 24, 28 and/or any of the elements of FIGS. 1-5. CE-DCE switches 24, 28 can include memory elements for storing information to be used in achieving the intelligent switching control, as outlined herein. Additionally, CE-DCE switches 24, 28 may include a processor that can execute software or an algorithm to perform the switching activities, as discussed in this Specification. These devices may further keep information in any suitable memory element (random access memory (RAM), ROM, EPROM, EEPROM, ASIC, etc.), software, hardware, or in any other suitable component, device, element, or object where appropriate and based on particular needs. Any possible memory items (e.g., database, table, cache, etc.) should be construed as being encompassed within the broad term 'memory element.' Similarly, any of the potential processing elements, modules, and machines described in this Specification should be construed as being encompassed within the broad term 'processor.'

Note that with the examples provided herein, interaction may be described in terms of two or three elements. However, this has been done for purposes of clarity and example only. In certain cases, it may be easier to describe one or more of the functionalities of a given set of flows by only referencing a limited number of network elements. It should be appreciated that communication system 10 (and its teachings) are readily scalable and can accommodate a large number of clouds, networks, and/or switches, as well as more complicated/sophisticated arrangements and configurations. Accordingly, the examples provided herein should not limit the scope or inhibit the broad teachings of communication system 10 as potentially applied to a myriad of other architectures. Additionally, although described with reference to particular scenarios where L2GIP modules 30*a*-*b*, L2G-STP modules 32*a*-*b*, and/or routing modules 34*a*-*b* are provided separately, these modules can be consolidated or combined in any suitable fashion, or provided in a single proprietary unit.

It is also important to note that the operations discussed with reference to FIGS. 1-6 illustrate only some of the possible scenarios that may be executed by, or within, communication system 10. Some of these operations may be deleted or removed where appropriate, or these steps may be modified or changed considerably without departing from the scope of the present disclosure. In addition, a number of these operations have been described as being executed concurrently with, or in parallel to, one or more additional operations. However, the timing of these operations may be altered considerably. The preceding operational flows have been offered for purposes of example and discussion. Substantial flexibility is provided by communication system 10 in that any suitable arrangements, chronologies, configurations, and timing mechanisms may be provided without departing from the teachings of the present disclosure.

Although the present disclosure has been described in detail with reference to particular embodiments, it should be understood that various other changes, substitutions, and alterations may be made hereto without departing from the spirit and scope of the present disclosure. For example, although the present disclosure has been described as operating in conferencing environments or arrangements, the present disclosure may be used in any communications environment that could benefit from such technology. Virtually any configuration that seeks to intelligently switch packets could enjoy the benefits of the present disclosure. Numerous other changes, substitutions, variations, alterations, and modifications may be ascertained to one skilled in the art and it is intended that the present disclosure encompass all such changes, substitutions, variations, alterations, and modifications as falling within the scope of the appended claims.

What is claimed is:

1. A method, comprising:
   executing an intermediate system to intermediate system (IS-IS) protocol for a first set of network links in a hybrid network;
   executing a spanning tree protocol (STP) for a second set of network links;
   generating a network topology that includes using a broadcast tree system identifier (ID) as a root bridge ID for the hybrid network;
   communicating the root bridge ID to a neighboring network element;
   wherein the broadcast tree system ID is associated with the IS-IS protocol, and the root bridge ID is associated with the STP;
   wherein a layer 2 gateway spanning tree protocol ("L2G-STP") mechanism for implementing a segmented spanning tree and a layer 2 Gateway Interconnect Protocol ("L2GIP") mechanism for building adjacencies between network elements are provided to prevent loops in the hybrid network; and
   wherein the broadcast tree system ID is provided as the root bridge ID per virtual local area network (VLAN), and wherein the broadcast tree system ID is a Media Access Control address (MAC address).

2. The method of claim 1, wherein an STP block is communicated to a redundant link, which connects a first switch and a second switch, and wherein the first and second switches converge on the network topology using the broadcast tree system ID.

3. The method of claim 1, wherein the network includes a Data Center Ethernet (DCE) network and a Classical Ethernet (CE) network, which form a layer-2 (L2) broadcast domain.

4. The method of claim 1, wherein a selected gateway port is configured to receive a superior Bridge Protocol Data Unit (BPDU), and in response to the superior BPDU, the selected port is placed in a blocked state.

5. The method of claim 1, wherein an auto-detection mechanism is utilized to transition to an uplink port type in response to receiving a superior BPDU.

6. One or more non-transitory computer-readable storage media including code for execution that when executed by a processor is operable to perform operations comprising:
   executing an intermediate system to intermediate system (IS-IS) protocol for a first set of network links in a hybrid network;
   executing a spanning tree protocol (STP) for a second set of network links;
   generating a network topology that includes using a broadcast tree system identifier (ID) as a root bridge ID for the hybrid network;
   communicating the root bridge ID to a neighboring network element;
   wherein the broadcast tree system ID is associated with the IS-IS protocol, and the root bridge ID is associated with the STP;
   wherein a layer 2 gateway spanning tree protocol ("L2G-STP") mechanism for implementing a segmented spanning tree and a layer 2 Gateway Interconnect Protocol ("L2GIP") mechanism for building adjacencies between network elements are provided to prevent loops in the hybrid network; and wherein the broadcast tree system ID is provided as the root bridge ID per virtual local area network (VLAN), and wherein the broadcast tree system ID is a Media Access Control address (MAC address).

7. The one or more non-transitory computer-readable storage media of claim 6, wherein an STP block is communicated to a redundant link, which connects a first switch and a second switch, and wherein the first and second switches converge on the network topology using the broadcast tree system ID.

8. The one or more non-transitory computer-readable storage media of claim 6, wherein the network includes a Data Center Ethernet (DCE) network and a Classical Ethernet (CE) network, which form a layer-2 (L2) broadcast domain.

9. The one or more non-transitory computer-readable storage media of claim 6, wherein a selected gateway port is configured to receive a superior Bridge Protocol Data Unit (BPDU), and in response to the superior BPDU, the selected port is placed in a blocked state.

10. The one or more non-transitory computer-readable storage media of claim 6, wherein an auto-detection mechanism is utilized to transition to an uplink port type in response to receiving a superior BPDU.

11. An apparatus, comprising:
a memory element configured to store electronic code,
a processor operable to execute instructions associated with the electronic code, and
a layer-2 (L2) gateway-spanning tree protocol (L2G-STP) module configured to interface with the processor and the memory element in order to cause the apparatus to:
execute an intermediate system to intermediate system (IS-IS) protocol for a first set of network links in a hybrid network;
execute a spanning tree protocol (STP) for a second set of network links;
generate a network topology that includes using a broadcast tree system identifier (ID) as a root bridge ID for the hybrid network;
communicate the root bridge ID to a neighboring network element;
wherein the broadcast tree system ID is associated with the IS-IS protocol, and the root bridge ID is associated with the STP;
wherein a layer 2 gateway spanning tree protocol ("L2G-STP") mechanism for implementing a segmented spanning tree and a layer 2 Gateway Interconnect Protocol ("L2GIP") mechanism for building adjacencies between network elements are provided to prevent loops in the hybrid network; and
wherein the broadcast tree system ID is provided as the root bridge ID per virtual local area network (VLAN), and wherein the broadcast tree system ID is a Media Access Control address (MAC address).

12. The apparatus of claim 11, wherein an STP block is communicated to a redundant link, which connects a first switch and a second switch, and wherein the first and second switches converge on the network topology using the broadcast tree system ID.

13. The apparatus of claim 11 wherein the network includes a Data Center Ethernet (DCE) network and a Classical Ethernet (CE) network, which form a layer-2 (L2) broadcast domain.

14. The apparatus of claim 11, wherein an auto-detection mechanism is utilized to transition to an uplink port type in response to receiving a superior BPDU.

\* \* \* \* \*